United States Patent
Kim et al.

(10) Patent No.: US 9,684,111 B2
(45) Date of Patent: Jun. 20, 2017

(54) DISPLAY APPARATUS

(71) Applicant: Samsung Display Co., LTD., Yongin, Gyeonge-Do (KR)

(72) Inventors: Hyungjin Kim, Seoul (KR); Young-Min Park, Hwaseong-si (KR); Jaesuk Yoo, Seoul (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/809,725

(22) Filed: Jul. 27, 2015

(65) Prior Publication Data

US 2016/0161660 A1  Jun. 9, 2016

(30) Foreign Application Priority Data

Dec. 3, 2014 (KR) .................. 10-2014-0172141

(51) Int. Cl.
*F21V 8/00* (2006.01)

(52) U.S. Cl.
CPC ......... *G02B 6/0021* (2013.01); *G02B 6/0031* (2013.01)

(58) Field of Classification Search
CPC .................. G02B 6/0021; G02B 6/0031
See application file for complete search history.

(56) References Cited

U.S. PATENT DOCUMENTS

2006/0114690 A1* 6/2006 Iki .................. G02B 6/0031
                                                              362/612

FOREIGN PATENT DOCUMENTS

| KR | 1020080001507 A | 1/2008 |
|---|---|---|
| KR | 1020080040033 A | 5/2008 |
| KR | 1020080053699 A | 6/2008 |
| KR | 1020080110014 A | 12/2008 |
| KR | 1020090117419 A | 11/2009 |
| KR | 1020100057321 A | 5/2010 |
| KR | 1020110107210 A | 9/2011 |

* cited by examiner

*Primary Examiner* — Thomas M Sember
(74) *Attorney, Agent, or Firm* — Robert E. Bushnell, Esq.

(57) ABSTRACT

Provided is a display apparatus including a display panel, a light guide plate, a first light source unit, and a first reflective member. The display panel may receive light to display an image. A first recess may be defined on a surface of the light guide plate. The first light source unit may include a plurality of light sources that generate the light and are received in the first recess. The first reflective member may be received in the first recess and disposed between two mutually adjacent light sources of the first light source unit to reflect the light.

17 Claims, 6 Drawing Sheets

US 9,684,111 B2

DISPLAY APPARATUS

CLAIM OF PRIORITY

This U.S. non-provisional patent application claims the priority of and all the benefits accruing under 35 U.S.C. §119 of Korean Patent Application No. 10-2014-0172141, filed on Dec. 3, 2014 in the Korean Intellectual Property Office (KIPO), the entire contents of which are hereby incorporated by reference.

BACKGROUND OF THE INVENTION

Field of Disclosure

The present disclosure herein relates to a display apparatus, and more particularly, to a display apparatus having an enhanced display quality.

Description of the Related Art

In the case of a display apparatus receiving light to display an image, the display apparatus includes a backlight unit generating a light and a display panel displaying an image by using the light.

In general, a display apparatus for a notebook computer or a mobile terminal includes an edge-type backlight unit which includes a light source and a light guide plate guiding a light generated from the light source to a display panel. Also, in the case of the edge-type backlight unit, the light source is disposed adjacent to an edge of the light guide plate to provide the light to the light guide plate and the light provided to the light guide plate may be guided to the display panel by a light guide pattern which the light guide plate has.

SUMMARY OF THE INVENTION

The present disclosure provides a display apparatus having enhanced light usage efficiency.

Embodiments of the inventive concept provide display apparatuses including a display panel receiving a light to display an image; a light guide plate having a first recess defined on a surface thereof; a first light source unit including a plurality of light sources generating the light and received in the first recess; and a first reflective member received in the first recess and disposed between two mutually adjacent light sources of the first light source unit to reflect the light.

The display apparatus may further include a first cover member received in the first recess, disposed between the first reflective member and the light guide plate and covering the first light source unit.

The first cover member may be coupled to the first reflective member.

The first cover member may have slopes reflecting the light and each of the slopes may be at an angle with respect to a bottom surface of the first recess.

The first cover member and the first reflective member may include reflective materials.

The first reflective member may have a polyprism shape.

The display apparatus may further include a printed circuit board (PCB) to which the first light source unit is electrically connected, wherein a bottom surface of the polyprism of the first reflective member may be coupled to the PCB.

The display apparatus may further include a receiving unit having a holding recess defined on an upper surface of the receiving unit. The printed circuit board may disposed in the holding recess of the receiving unit.

The light guide plate may include two sides extended in a first direction and two sides extended in a second direction intersecting with the first direction.

The first recess may be extended at a center of the light guide plate in the first direction and the first light source unit may be disposed in the first direction.

A second recess spaced apart from the first recess may be defined on the surface of the light guide plate, and the display apparatus may further include: a second light source unit including a plurality of light sources generating the light and received in the second recess; and a second reflective member received in the second recess and disposed between two mutually adjacent light sources of the second light source unit to reflect the light.

The display apparatus may further include a second cover member received in the second recess, disposed between the second reflective member and the light guide plate and covering the second light source unit.

The second cover member may be coupled to the second reflective member.

The second cover member may have slopes reflecting the light and each of the slopes is at an angle with respect to a bottom surface of the second recess.

The display apparatus may further include a PCB to which the second light source unit is electrically connected, wherein the second reflective member may be coupled to the PCB.

The second recess may be extended in the first direction and the second light source unit may be disposed in the first direction.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
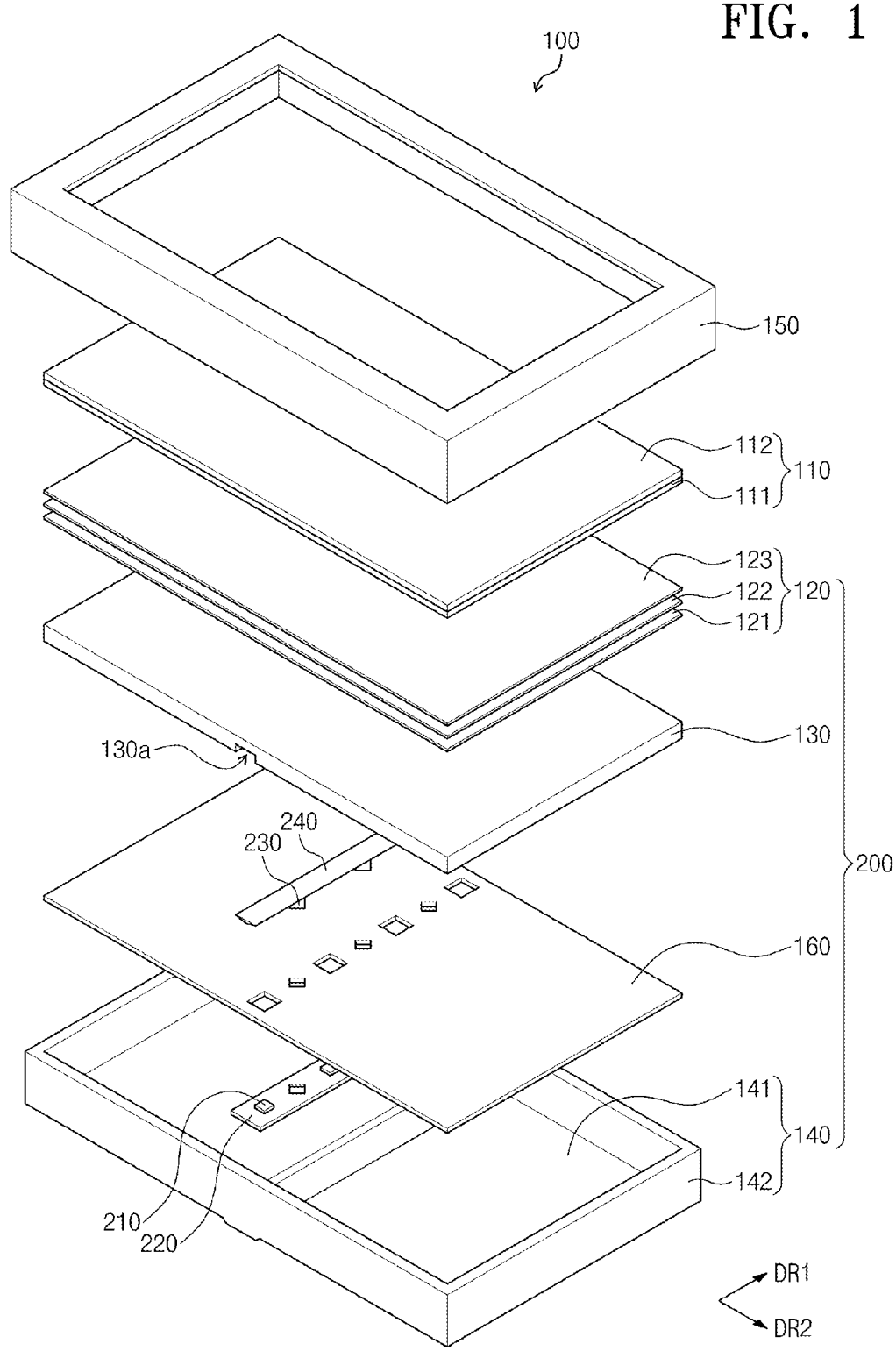
FIG. 1 is a perspective view of a display apparatus according to a first embodiment of the present disclosure.

Embodiments of the present disclosure are described below in detail with reference to the accompanying drawings. The above objectives, characteristics and effects of the present disclosure will be easily understood through the accompanying drawings and related embodiments. However, the present disclosure is not limited to embodiments to be described below but may be implemented through various applications and variations. Rather, the embodiments of the present disclosure to be described below are provided to make the technical spirit disclosed herein clearer and fully convey the technical spirit of the present disclosure to a person skilled in the art. Thus, the scope of the present disclosure should not be construed as being limited by embodiments to be described below. The same reference numerals denoted in the following embodiments and the accompanying drawings represent the same components.

Also, the terms "first", "second", etc. used herein are not used as limited meanings but used for the purpose of discriminating one component from another. When a portion of a layer, a region, or a component is referred to as being "on" another portion, it can be directly on the other portion or intervening layers, regions, or components may also be present in between.

FIG. 1 is a perspective view of a display apparatus according to an embodiment of the present disclosure.

Referring to FIG. 1, a display apparatus 100 includes a display panel 110, a backlight unit 200, and a top chassis 150.

The display panel 110 displays an image. The display panel 110 may be any one of a liquid crystal display (LCD) panel, an electrowetting display panel, an electrophoretic display panel, and a micro electro mechanical system (MEMS) display panel. In the present embodiment, the LCD panel is described as the display panel 110.

The display panel 110 may be a quadrilateral plate having two pairs of sides. In the present embodiment, the display panel 110 may be of a rectangular shape having a pair of long sides and a pair of short sides. The display panel 110 includes a display substrate 111, an opposite substrate 112 facing the display substrate 111, and a liquid crystal layer (not shown) between the display substrate 111 and the opposite substrate 112. The display panel 110 may include a display region (not shown) on which an image is displayed, and a non-display region (not shown) surrounding the display region and not displaying the image, when viewed from top.

The backlight unit 200 provides the display panel 110 with light and the backlight unit 200 may be disposed under the display panel 110. The backlight unit 200 may include optical sheets 120, a light guide plate 130, a receiving unit 140, a reflective sheet 160, a first light source unit 210, a printed circuit board (PCB) 220, a first reflective member 230, and a first cover member 240.

The receiving unit 140 may include a bottom portion 141 and sidewalls 142 extended from the bottom portion 141. The sidewalls 142 may be extended upwards from the bottom portion 141. The receiving unit 140 may receive the first light source unit 210 and the light guide plate 130 which may be held on the bottom portion 141.

The light guide plate 130 may receive light from the first light source unit 210 and guide received light to the display panel 110. A first recess 130a may be defined on a surface of the light guide plate 130. The surface of the light guide plate may be a surface facing the bottom portion 141. The first light source unit 210 may be received in the first recess 130a of the light guide plate 130. Details of the light guide plate 130 are described with reference to FIG. 2.

The first light source unit 210 may include a plurality of light sources. In the present embodiment, each of the plurality of light sources may be a chip on board (COB) type light emitting diode (LED).

The first light source unit 210 may be received in the first recess 130a to provide light to the light guide plate 130. The PCB 220 may be disposed between the first light source unit 210 and the bottom portion 141. The first light source unit 210 may be mounted on the PCB 220 to receive a driving voltage from the PCB 220.

Although the present embodiment shows the case in which the first light source unit 210 includes four light sources, the present disclosure is not limited thereto and the number of the light sources may vary depending on the size of the display apparatus 100.

The first reflective member 230 is received in the first recess 130a and may be disposed between two mutually adjacent light sources of the first light source unit 210. The first reflective member 230 may reflect light generated from the first light source unit 210 so that the light may enter the light guide plate 130. Details of the first reflective member 230 are described with reference to FIG. 2.

The first cover member 240 may be received in the first recess 130a and disposed between the first reflective member 230 and the light guide plate 130. The first cover member 240 may be coupled to the first reflective member 230. The first cover member 240 may cover the first light source unit 210.

Each of the first reflective member 230 and the first cover member 240 may include a reflective material. The reflective material is not particularly limited to a specific material if being usable as a reflective material. The first reflective member 230 and the first cover member 240 may include a structure and a reflective sheet may be attached to the structure. The structure may include a polyphthalamide (PPA) or polymethylmethacrylate (PMMA) resin. The another embodiment the first reflective member 230 and the first cover member 240 may include the structure may be coated by titanium oxide ($TiO_2$).

Light generated from the first light source unit 210 is reflected by the first reflective member 230 and the first cover member 240 to enter the light guide plate 130. As a result, light usage efficiency may be enhanced. Also, light emitted upward from the first light source unit 210 may be reflected by the first cover member 240 to enter the light guide plate 130. As a result, since light from a region corresponding to the location of the first light source unit 210 is blocked, the luminance of light provided by the backlight unit 200 may be uniform.

The optical sheets 120 may be arranged between the light guide plate 130 and the display panel 110. The optical sheets 120 may play a role in controlling the path of light guided from the light guide plate 130. The optical sheets 120 may include a diffusion sheet 121, a prism sheet 122 and a protective sheet 123.

The diffusion sheet 121 may diffuse light, and the prism sheet 122 may focus light so that the travel direction of light diffused from the diffusion sheet 121 is similar to the normal direction of the display panel 110. The protective sheet 123 may protect the prism sheet 122 from an external shock. Although the present embodiment describes the case that the optical sheets 120 include one diffusion sheet 121, one prism sheet 122 and one protective sheet 123, the present disclosure is not limited thereto. For example, the optical sheets 120 may be formed by overlaying at least one of the diffusion sheet 121, the prism sheet 122 and the protective sheet 123 in plurality in another embodiment of the present disclosure, and one or more sheets may not be provided as needed.

Figure 6:
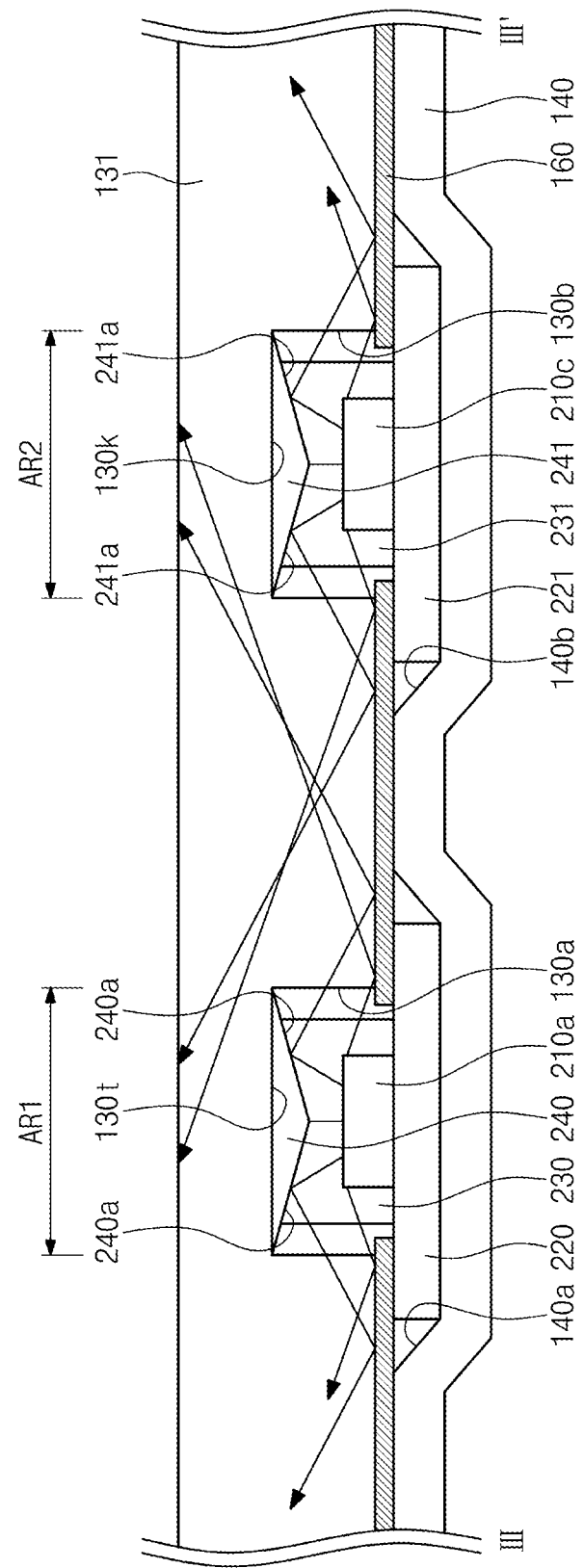
FIG. 6 is a cross-sectional view taken along line III-III' in FIG. 5.

The reflective sheet 160 may be disposed between the light guide plate 130 and the bottom portion 141. The reflective sheet 160 may reflect light leaked from the light guide plate 130 so that leaked light re-enters the light guide plate 130 (FIG. 6). A hole through which the first light source unit 210 may pass may be defined in the reflective sheet 160.

The top chassis 150 may be disposed on the display panel 110 to cover a non-display region of the display panel 110. The top chassis 150 may be coupled to the receiving unit 140 to support the edge of the display panel 110 and a display window that exposes the display region of the display panel 110 may be defined on the top chassis 150.

Figure 2:
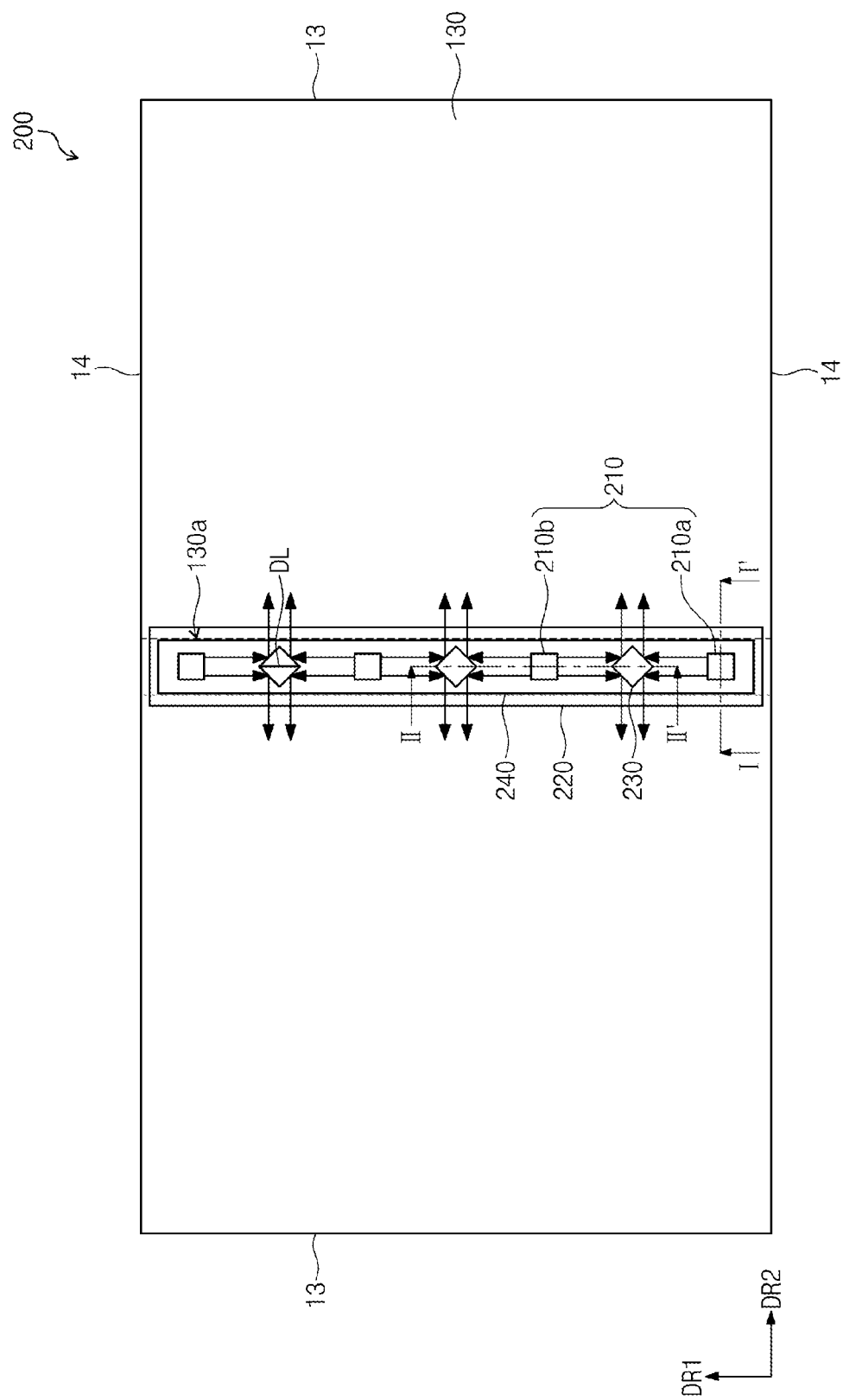
FIG. 2 is a schematic view of a backlight unit in FIG. 1.

FIG. 2 is a schematic view of the backlight unit in FIG. 1.

Referring to FIG. 2, the light guide plate 130 may include two sides 13 extended in a first direction DR1 and two sides 14 extended in a second direction DR2 that intersects with the first direction DR1. In the present embodiment, the first direction DR1 may be orthogonal to the second direction DR2. Thus, the light guide plate 130 may be of a rectangular plate shape.

The first recess 130a may be extended on a surface of the light guide plate 130 in the first direction DR1 and the first light source unit 210 may be disposed in the first direction DR1. The first recess 130a may receive the first cover member 240, the first reflective member 230, and the first light source unit 210.

In the present embodiment, one of two mutually adjacent light sources of the first light source unit 210 is defined as a first light source 210a and the other thereof is defined as a second light source 210b, for the convenience of description.

The second light source 210b may be spaced apart from the first light source 210a in the first direction DR1. The first reflective member 230 may be disposed between the first light source 210a and the second light source 210b. The first reflective member 230 may include a reflective material to reflect light emitted from the first light source 210a and the second light source 210b.

A portion of light emitted from each of the first light source 210a and the second light source 210b may be reflected by the first reflective member 230 to enter the light guide plate 130. That is, light that has not entered the light guide plate 130 from each of the first light source 210a and the second light source 210b may be reflected by the first reflective member 230 to enter the light guide plate 130. Thus, the light usage efficiency of the display apparatus 100 (in FIG. 1) may be enhanced.

In the present embodiment, the first reflective member 230 may have a polyprism shape extended in the thickness direction of the light guide plate 130. More particularly, the first reflective member 230 may have a square pillar shape. The bottom surface of a square pillar may be coupled to the PCB 220. The diagonal line DL of the first reflective member 230 may be parallel to the first direction DR1 when viewed from the top surface. That is, the first reflective member 230 may have a diamond shape when viewed from the top surface. Thus, light emitted from the first light source 210a and the second light source 210b in the first direction DR1 may enter a lateral face of the first reflective member 230 tilted and then be reflected to easily enter the light guide plate 130.

Although the present embodiment shows the case that the first reflective member 230 has a diamond shape when viewed from top, another embodiment of the present disclosure may have a polygonal shape such as a shape having five or more sides when viewed form top, unlike the present disclosure. A still another embodiment of the present disclosure may have a circular shape when viewed from top, and a still another embodiment may also have a polygon having rounded edges when viewed from top.

Figure 3:
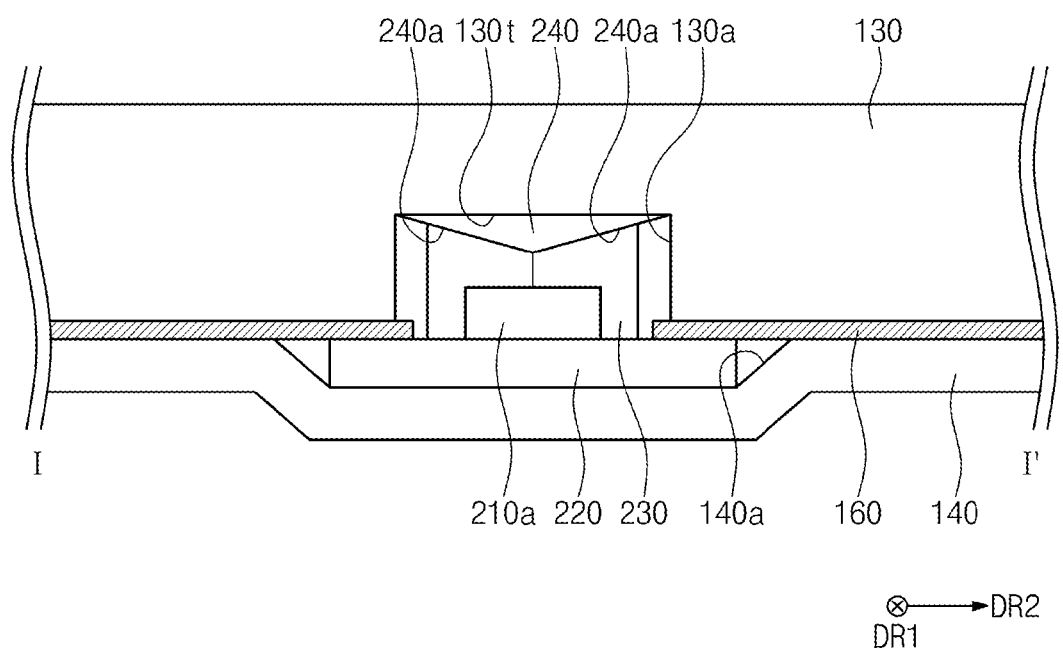
FIG. 3 is a cross-sectional view taken along line I-I' in FIG. 2.

FIG. 3 is a cross-sectional view taken along line I-I' in FIG. 2.

Referring to FIG. 3, the first cover member 240 may have slopes 240a reflecting light. The slopes 240a may be at an angle with respect to a top portion 130t of the first recess 130a. Light emitted from the top surface of the first light source 210a may be reflected from the slopes 240a to enter the light guide plate 130.

Since the first cover member 240 covers the top surface of the first light source unit 210 (in FIG. 2) in the present embodiment, it is possible to prevent a region corresponding to the location of the first light source unit 210 (in FIG. 2) from experiencing a hot spot phenomenon in which luminance at certain location of the display panel increases. As a result, the backlight unit 200 (in FIG. 1) may provide light having uniform luminance to the display panel 110 (in FIG. 1) and the display quality of the display apparatus 100 (in FIG. 1) may be enhanced.

In the present embodiment, the first reflective member 230 and the first cover member 240 may include the same reflective material. For example, the first reflective member 230 and the first cover member 240 may be formed in such a manner that a reflective sheet is attached to a structure including a polyphthalamide (PPA) or polymethylmethacrylate (PMMA) resin or a white coating layer or the structure may be coated by a metal layer such as titanium oxide ($TiO_2$).

In the present embodiment, the reflectivity of the first reflective member 230 may be about 90% to about 100%, and more particularly, about 100%. Thus, most of the light emitted from the first light source unit 210 (in FIG. 2) in the first direction DR1 may be reflected to enter the light guide plate 130.

Also, the reflectivity of the first cover member 240 may be about 70% to about 90%, and its transmissivity may be about 10% to about 30%. More particularly, the reflectivity may be about 80% and the transmissivity may be about 20%. Thus, since a portion of the light emitted upward from the first light source unit 210 (in FIG. 2) passes through the first cover member 240, it is possible to prevent a phenomenon in which a region corresponding to the location of the first light source unit 210 (in FIG. 2) appears dark. As a result, the backlight unit 200 (in FIG. 1) may provide light having uniform luminance to the display panel 110 (in FIG. 1) and the display quality of the display apparatus 100 (in FIG. 1) may be enhanced.

In the present embodiment, a holding recess 140a in which the PCB 220 may be held may be formed in the receiving unit 140. The holding recess 140a may be extended in the first direction DR1. The depth of the holding recess 140a may be the same as the thickness of the PCB 220. When the PCB 220 is received in the holding recess 140a, a gap between the first light unit 210 (in FIG. 1) and the light guide plate 130 may decrease. As a result, the thickness of the display apparatus 100 (in FIG. 1) may decrease.

In the present embodiment, the receiving unit has a bottom protrusion in a region of the holding recess 140a, the present disclosure is not limited thereto. For example, the bottom of the receiving unit has a flat shape.

In the present embodiment, the first reflective member 230 may support the light guide plate 130. For example, when the light guide plate 130 is deformed and sagged due to heat or pressed by an external force, the first reflective member 230 may function as a spacer. Thus, it is possible to prevent a damage to the first light source unit 210 (in FIG. 1) by the deformation of the light guide plate 130.

Figure 4:
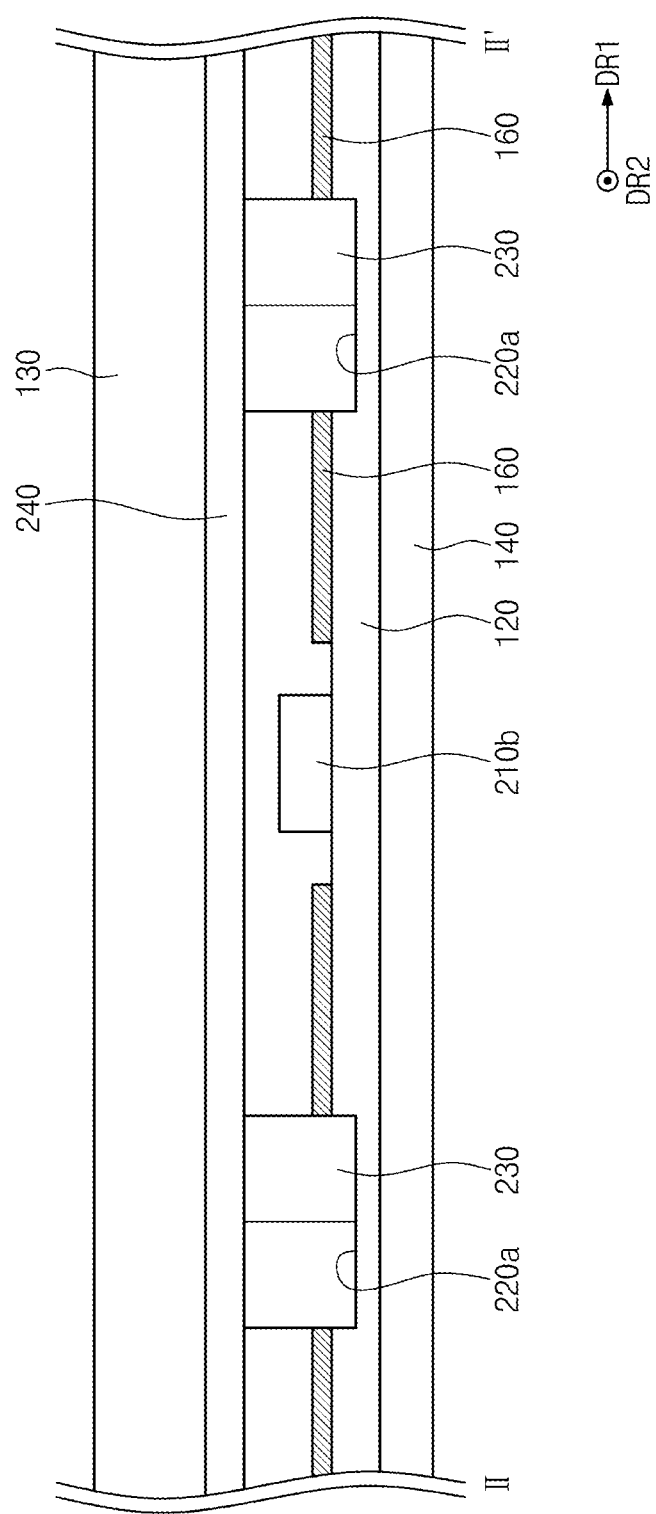
FIG. 4 is a cross-sectional view taken along line II-II' in FIG. 2.

FIG. 4 is a cross-sectional view taken along line II-II' in FIG. 2.

Referring to FIG. 4, a coupling recess 220a may be formed in the PCB 220. The first reflective member 230 may be coupled to the coupling recess 220a. When a portion of the first reflective member 230 is coupled and fixed to the coupling recess 220a, the first reflective member 230 may be more stably coupled to the PCB 220 and in addition, it is easier to align.

Another embodiment of the present disclosure may omit the coupling recess 220a. In this case, by using an adhesive member having adhesion such as a double-sided tape or an adhesive, it is possible to couple the first reflective member 230 to the PCB 220.

Figure 5:
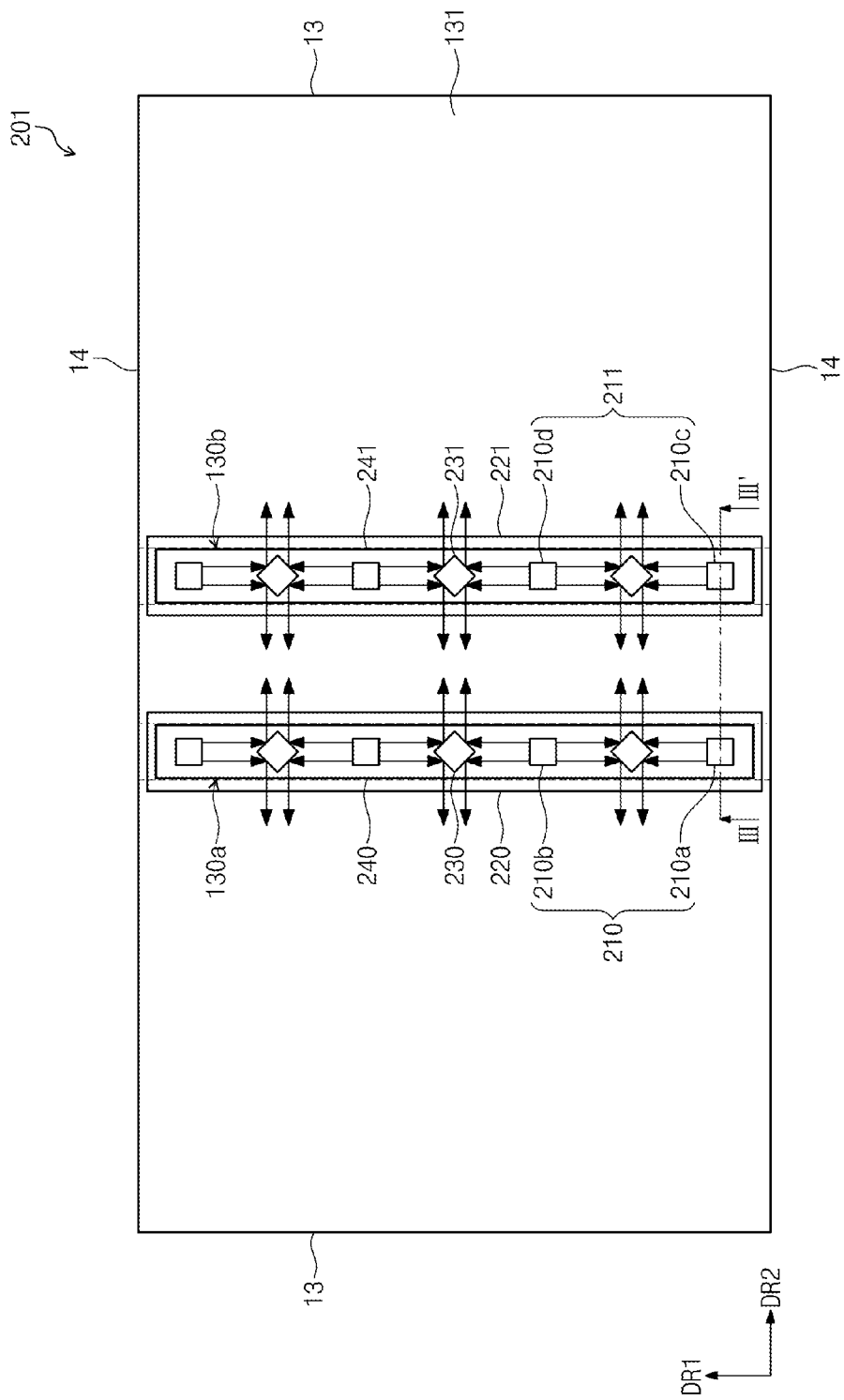
FIG. 5 is a schematic plane view of a backlight unit according to a second embodiment of the present disclosure.

FIG. 5 is a schematic plane view of a backlight unit according to another embodiment of the present disclosure, and FIG. 6 is a cross-sectional view taken along line III-III' in FIG. 5. In describing FIGS. 5 and 6, the components described with reference to FIG. 2 are denoted by the reference numerals and their repeated descriptions will be omitted.

Referring to FIGS. 5 and 6, a first recess 130a and a second recess 130b may be defined on a surface of a light guide plate 131. Each of the first recess 130a and the second recess 130b may be extended in a first direction DR1. The second recess 130b may be spaced apart from the first recess 130a in a second direction DR2 that intersects with the first direction DR1.

The second recess 130b may receive a second light source unit 211, a second reflective member 231, and a second cover member 241.

The second light source unit 211 may include a plurality of light sources. The second light source unit 211 may be received in the second recess 130b to provide light to the light guide plate 131. A PCB 221 may be disposed between the second light source unit 211 and a bottom portion 141. The second light source unit 211 may be mounted on the PCB 221 to receive a driving voltage from the PCB 221.

A holding recess 140b in which the PCB 221 may be held may be formed in a receiving unit 140. The holding recess 140a may be extended in the first direction DR1. The depth of the holding recess 140b may be the same as the thickness of the PCB 221.

In the present embodiment, one of two mutually adjacent light sources of the second light source unit 211 is defined as a third light source 210c and the other thereof is defined as a fourth light source 210d, for the convenience of description. The third light source 210c may be spaced apart from the fourth light source 210d in the first direction DR1.

The second reflective member 231 may be disposed between the third light source 210c and the fourth light source 210d. The second reflective member 231 may have the same shape as the first reflective member 230. The second reflective member 231 may include a reflective material to reflect light emitted from the third light source 210c and the fourth light source 210d.

Light emitted from the third light source 210c and the fourth light source 210d in parallel to the first direction DR1 may be reflected by the second reflective member 231 to enter the light guide plate 131. As a result, the light usage efficiency of the backlight unit 201 may be enhanced.

The second cover member 241 may be disposed between the second reflective member 231 and the light guide plate 131. The second cover member 241 may be coupled to the second reflective member 231 to cover the second light source unit 211. The second cover member 241 may have a shape of a triangular prism extended in the first direction DR1.

The second cover member 241 may have slopes 241a reflecting light. The slopes 241a may be at an angle with respect to a bottom portion 130k of the second recess 130b. Light emitted from the top surface of the second light source 211 may be reflected from the slopes 241a to enter the light guide plate 131.

In the present embodiment, the first cover member 240, the first reflective member 230, the second cover member 241 and the second reflective member 231 may include the same material. Also, the reflectivity of each of the first cover member 240, the first reflective member 230, the second cover member 241 and the second reflective member 231 may be about 90% to about 100% and more particularly, about 100%.

For the convenience of description, a region of the light guide plate 131 corresponding to the location of the first light source unit 210 is defined as a first region AR1, and a region of the light guide plate 131 corresponding to the location of the second light source unit 211 is defined as a second region AR2.

The first cover member 240 may cover the first light source unit 210 and the second cover member 241 may cover the second light source unit 211. As a result, light emitted upward from the first light source unit 210 and the second light source unit 211 is reflected to the first cover member 240 and the second cover member 241 to enter the light guide plate 131. Thus, it is possible to prevent light from becoming focused on the first region AR1 and the second region AR2.

Also, a portion of light emitted from the first light source unit 210 may be transmitted to the second region AR2, a portion of light emitted from the second light source unit 211 may be transmitted to the first region AR1. The reflectivities of the first cover member 240 and the second cover member 241 may be about 100%, and even if the transmissivities thereof are about 0%, light may be transmitted to the first region AR1 and the second region AR2. Thus, it is possible to prevent a phenomenon in which the first region AR1 and the second region AR2 appear dark by the first cover member 240 and the second cover member 241. As a result, the backlight unit 201 (in FIG. 5) may provide light having uniform luminance to the display panel 110 (in FIG. 1) and the display quality of the display apparatus 100 (in FIG. 1) may be enhanced.

Another embodiment of the present disclosure a plurality of recesses spaced apart from the first recess are defined on the surface of the light guide plate, and the display apparatus further comprises: a plurality of light source units received in the recesses, each of the light source units comprising a plurality of light sources generating the light; and a plurality of reflective members received in the recesses, each disposed between two mutually adjacent light sources of the light source units to reflect the light.

According to the display apparatus according to an embodiment of the present disclosure, light usage efficiency may be enhanced by the reflective member disposed between mutually adjacent light sources.

According to the display apparatus according to an embodiment of the present disclosure, the backlight unit may provide light having uniform luminance by the cover member disposed on the light sources and as a result, the display quality of the display apparatus may be enhanced.

According to the display apparatus according to an embodiment of the present disclosure, owing to the reflective member received in the recess of the light guide plate, it is possible to prevent light sources from becoming damaged by the deformation of the light guide plate.

While exemplary embodiments of the present disclosure are described above, a person skilled in the art may understand that many modifications and variations may be implemented without departing from the spirit and technical scope of the present disclosure defined in the following claims. Thus, the technical scope of the present disclosure is not limited to matters described in the detailed description but should be defined by the following claims.

What is claimed is:

1. A display apparatus comprising:
a display panel receiving light to display an image;
a light guide plate having a first recess defined on a surface of the light guide plate;
a first light source comprising a plurality of light sources generating the light and received in the first recess; and
a first reflective member having a pillar shape extended in a thickness direction of the light guide plate, received in the first recess and disposed between two mutually adjacent light sources of the first light source to reflect the light.

2. The display apparatus of claim 1, further comprising a first cover member received in the first recess, disposed between the first reflective member and the light guide plate, and covering the first light source.

3. The display apparatus of claim 2, wherein the first cover member is coupled to the first reflective member.

4. The display apparatus of claim 2, wherein the first cover member has slopes reflecting the light and each of the slopes is at an angle with respect to a bottom surface of the first recess.

5. The display apparatus of claim 2, wherein the first cover member and the first reflective member comprise reflective materials.

6. The display apparatus of claim 2, wherein the first reflective member has a polyprism shape.

7. The display apparatus of claim 6, further comprising a printed circuit board (PCB) to which the first light source is electrically connected,
wherein a bottom surface of the polyprism of the first reflective member is coupled to the PCB.

8. The display apparatus of claim 7, further comprising a receiving unit having a holding recess defined on an upper surface of the receiving unit, wherein the printed circuit board is disposed in the holding recess of the receiving unit.

9. The display apparatus of claim 2, wherein the light guide plate comprises two sides extended in a first direction and two sides extended in a second direction intersecting with the first direction.

10. The display apparatus of claim 9, wherein the first recess is extended at a center of the light guide plate in the first direction and the first light source is disposed in the first direction.

11. The display apparatus of claim 9, wherein a second recess spaced apart from the first recess is defined on the surface of the light guide plate, and the display apparatus further comprises:
a second light source comprising a plurality of light sources generating the light and received in the second recess; and
a second reflective member received in the second recess and disposed between two mutually adjacent light sources of the second light source to reflect the light.

12. The display apparatus of claim 11, further comprising a second cover member received in the second recess, disposed between the second reflective member and the light guide plate, and covering the second light source.

13. The display apparatus of claim 12, wherein the second cover member is coupled to the second reflective member.

14. The display apparatus of claim 12, wherein the second cover member has slopes reflecting the light and each of the slopes is at an angle with respect to a bottom surface of the second recess.

15. The display apparatus of claim 12, further comprising a PCB to which the second light source is electrically connected, the second reflective member being coupled to the PCB.

16. The display apparatus of claim 12, wherein the second recess is extended in the first direction and the second light source is disposed in the first direction.

17. The display apparatus of claim 9, wherein a plurality of recesses spaced apart from the first recess are defined on the surface of the light guide plate, and
the display apparatus further comprises:
a plurality of light source received in the recesses, each of the light source comprising a plurality of light sources generating the light; and
a plurality of reflective members received in the recesses, each disposed between two mutually adjacent light sources of the light source to reflect the light.

* * * * *